US008103440B2

(12) United States Patent
Sengoku et al.

(10) Patent No.: US 8,103,440 B2
(45) Date of Patent: Jan. 24, 2012

(54) NAVIGATION SERVER, NAVIGATION APPARATUS, AND NAVIGATION SYSTEM

(75) Inventors: Koji Sengoku, Minato-ku (JP); Masakuni Tsuge, Minato-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 586 days.

(21) Appl. No.: 12/373,848

(22) PCT Filed: Jul. 13, 2007

(86) PCT No.: PCT/JP2007/063984
§ 371 (c)(1),
(2), (4) Date: Jan. 14, 2009

(87) PCT Pub. No.: WO2008/007774
PCT Pub. Date: Jan. 17, 2008

(65) Prior Publication Data
US 2010/0017110 A1   Jan. 21, 2010

(30) Foreign Application Priority Data

Jul. 14, 2006  (JP) .................................. 2006-193691
Aug. 16, 2006  (JP) .................................. 2006-221778

(51) Int. Cl.
*G01C 21/00*   (2006.01)
(52) U.S. Cl. ........ 701/200; 701/201; 701/202; 340/988; 340/991; 340/993; 340/994
(58) Field of Classification Search .................. 701/200, 701/201, 202; 340/988, 991, 993, 994
See application file for complete search history.

(56) References Cited

U.S. PATENT DOCUMENTS 6,314,347 B1 * 11/2001 Kuroda et al. .................. 701/22
6,334,086 B1 * 12/2001 Park et al. ..................... 701/117
(Continued)

FOREIGN PATENT DOCUMENTS

EP         1505369 A1    2/2005
(Continued)

OTHER PUBLICATIONS

Supplementary European Search Report for Application No. 07790765.7, dated Sep. 15, 2010.

(Continued)

*Primary Examiner* — Ramsey Refai
*Assistant Examiner* — Milena Racic
(74) *Attorney, Agent, or Firm* — Nelson Mullins Riley & Scarborough LLP; Anthony A. Laurentano

(57) ABSTRACT

Provided is a navigation system which can contribute to guidance of a moving device such as a vehicle to a destination along a route appropriate from a viewpoint of energy economy. According to second information (VIN, $L_j$, $OP_j$) on a second probe car $Q_2$, an eco-index $ECO_j$ is evaluated for each combination of a link identifier $L_j$ and a vehicle identifier VIN according a first function $f_1$. According to the evaluation result, a second function $f_2$ is set. According to support request information (VIN) on a support subject car Q, an eco-index $ECO_k$ is evaluated for an individual link identifier $L_k$ according to the second function $f_2$. The evaluation result or the road traffic information decided according to the evaluation result is recognized by a navigation apparatus (200) mounted on the support subject car Q.

10 Claims, 5 Drawing Sheets

U.S. PATENT DOCUMENTS

2006/0047414 A1 3/2006 Adachi

FOREIGN PATENT DOCUMENTS

| | | |
|---|---|---|
| EP | 1515122 A1 | 3/2005 |
| JP | 2002-350152 | 12/2002 |
| JP | 2005-163584 | 6/2005 |
| JP | 2005172582 A * | 6/2005 |
| JP | 2006058085 A * | 3/2006 |
| JP | 2006300780 A * | 11/2006 |

OTHER PUBLICATIONS

International Search Report for Application No. PCT/JP2007/063984, dated Oct. 16, 2007.

* cited by examiner

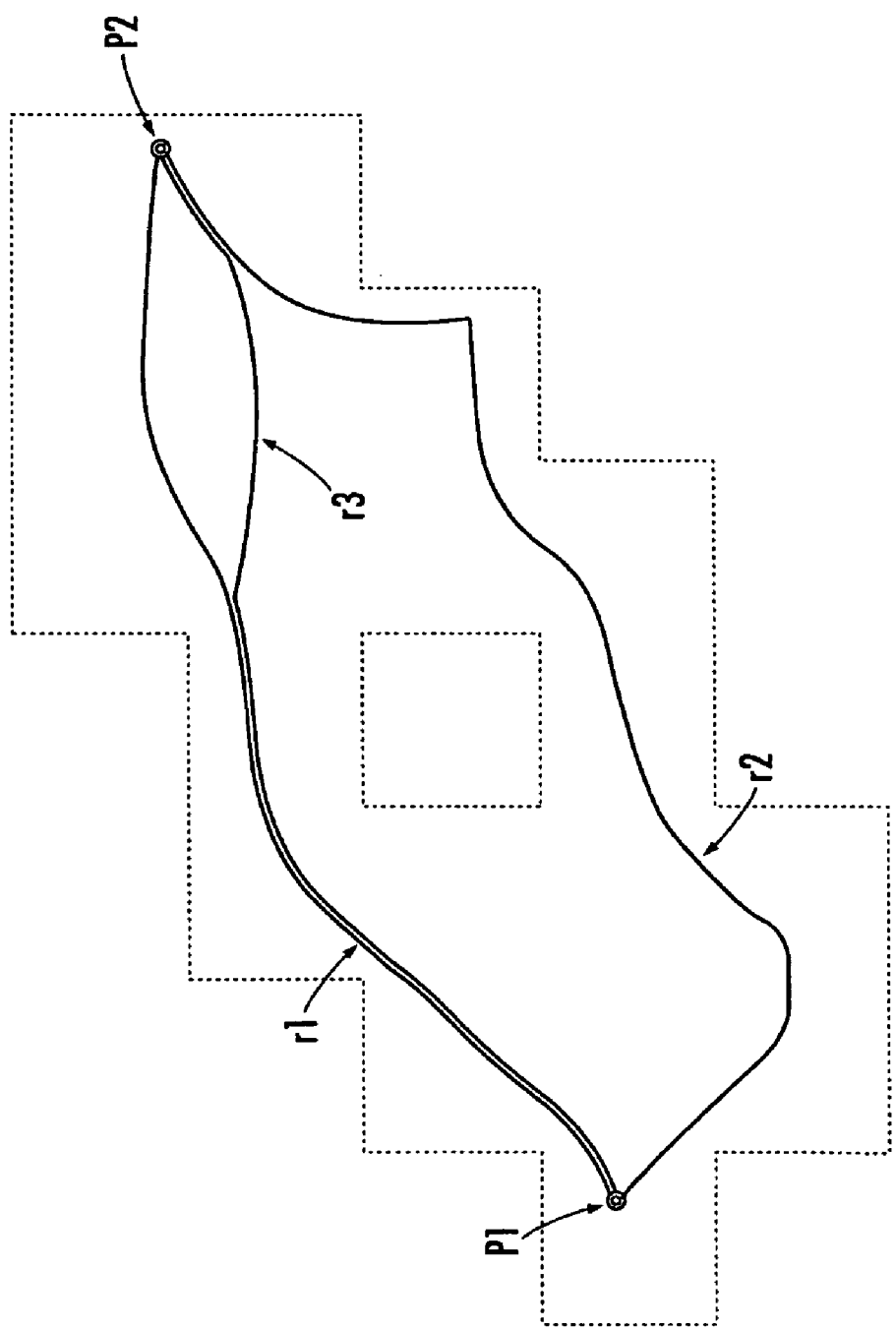

NAVIGATION SERVER, NAVIGATION APPARATUS, AND NAVIGATION SYSTEM

PRIORITY CLAIM

The present application is a 35 U.S.C. 371 national stage filing of International Patent Application No. PCT/JP2007/063984, filed Jul. 13, 2007, which is based on and claims the priority benefit of Japanese Patent Applications No. 2006-193691 filed on Jul. 14, 2006 and No. 2006-221778 filed on Aug. 16, 2006, the contents of which are incorporated herein by reference in its entirety.

BACKGROUND OF THE INVENTION

1. Field of the Invention

The present invention relates to a navigation server which is configured to support the guidance of a mobile device via a navigation apparatus mounted in the mobile device on the basis of communication with the navigation apparatus, the navigation apparatus which is configured to guide the mobile device on the basis of communication with the navigation server, and a navigation system which is comprised of the navigation server and the navigation apparatus.

2. Description of the Related Art

As the saving of the earth environment and effective utilization of energy resources become more concerned by human beings, how to improve a mileage of a vehicle has been an important task.

Accordingly, there has been disclosed an art (for example, refer to Japanese Patent Laid-open No. 2002-350152, paragraphs 0077 to 0079) in which an eco-index of a vehicle related to a location or a route individually in map information is preliminarily stored in a database; with respect to a location or a route specified by a user, the eco-index thereof is searched in the database, and the retrieved eco-index will be displayed, overlapping with the map information, on a display in a user's terminal.

There has been disclosed another art (for example, refer to Japanese Patent Laid-open No. 2005-163584, paragraphs 0072 to 0075) in which a predicted route which has the best mileage of a vehicle is retrieved from an information center by considering mileage data registered in a database, and the retrieved route is received from the information center and displayed on a navigation apparatus mounted in the vehicle.

However, even though a vehicle with an identical identifier drives on the same road, the mileage of the vehicle will vary according to an operation state thereof, such as acceleration and deceleration pattern or the like. Therefore, to search or set a route without considering a driving state of an individual vehicle may be practically inappropriate from the viewpoint of the mileage of a driving vehicle.

SUMMARY OF THE INVENTION

The present invention has been accomplished in view of the aforementioned problems, and it is therefore an objective of the present invention to provide a navigation system which may contribute to guide a mobile device such as a vehicle or the like to a destination position along an appropriate route from the viewpoint of saving energy.

A navigation server according to a first aspect of the present invention, which is configured to support an arithmetic processing performed by a navigation apparatus mounted in a mobile device serving as a support subject on the basis of communication with the mobile device, includes: a first function storing element which is configured to store a first function representing a correlation between a device identifier for identifying the mobile device, operation information representing an operation state of the mobile device, and an energy index representing an amount of energy consumed by the mobile device; a second function storing element which is configured to store a second function representing a correlation between the device identifier, a link identifier for identifying a respective link, and the energy index; a first support processing element which is configured to recognize the device identifier of the second probe mobile device, the link identifier of a link where the second probe mobile device has passed, and the operation information detected by a probe device mounted in the second probe mobile device on the basis of communication with the second probe mobile device; evaluate the energy index for each combination of the link identifier and the device identifier according to the first function on the basis of the recognition result; and set or modify the second function on the basis of the evaluation result; and a second support processing element which is configured to recognize the device identifier of the mobile device serving as the support subject; evaluate the energy index for an individual link identifier according to the second function on the basis of the recognition result; and enable the navigation apparatus mounted in the mobile device serving as the support subject to recognize the evaluation result or road traffic information defined according to the evaluation result on the basis of communication with the mobile device serving as the support subject.

According to the navigation server of the first aspect of the present invention, on the basis of communication with the second probe mobile device, the device identifier of the second probe mobile device, the link identifier, and the operation information representing the operation state of the second probe mobile device are recognized. "Communication with a mobile device" refers to a communication with a communication instrument mounted in the mobile device. "Device identifier" represents the information for identifying the second probe mobile device which affects the energy index of each second probe mobile device. Specifically, the information contains the type, the specification and the like of the second probe mobile device. "Link identifier" contains information for identifying a link which refers to road elements joining two arbitrary locations in a road, such as an intersection, a turnoff or the like. "Operation information" represents the operation state of the second probe mobile device.

On the basis of the recognized information, the energy index is evaluated for each combination of the device identifier and the link identifier according to the first function representing a correlation between the device identifier, the operation information and the energy index. "Energy index" represents the energy amount consumed by an individual second probe mobile device. According thereto, the energy consumption amount of the individual second probe mobile device may be appropriately evaluated by considering the operation state of the individual second probe mobile device in an individual link.

Further, on the basis of the evaluation result, the second function representing a correlation between the device identifier, the link identifier and the energy index is set. As aforementioned, the energy index representing the energy consumption amount of the second probe mobile device may be appropriately evaluated by considering the operation state of the second probe mobile device in an individual link, it is possible to appropriately set the second function from the viewpoint of estimating or predicting the operation state of an arbitrary mobile device in the individual link.

Thereafter, on the basis of communication with the mobile device serving as the support subject, the device identifier of the support subject, namely the mobile device, is recognized. On the basis of the recognition result, the energy index is evaluated individually for the link identifier according to the second function. The energy index evaluated for the individual link identifier or the road traffic information defined according to the energy index is recognized by the navigation apparatus mounted in the mobile device. Therefore, the energy index related to the individual link identifier or the road traffic information defined according to the energy index may be appropriately evaluated or generated from the viewpoint of estimating or predicting the operation state of the mobile device serving as the support subject in the individual link. Accordingly, it is possible to guide the mobile device serving as the support subject, with an attempt to save the energy, from the departure position to the destination position on the basis of the road traffic information in the navigation apparatus.

The navigation server according to a second aspect of the present invention is dependent on the first aspect of the present invention, wherein the second support processing element sets one or a plurality of support routes or recognizes a navigation route for guiding the mobile device serving as the support subject from a departure position to a destination position on the basis of communication with the mobile device serving as the support subject; further recognizes the link identifier of an individual link which constitutes a part of or the entire part of the support route or the navigation route, or the link identifier of an individual link in an area which includes a part of or the entire part of the support route or the navigation route; and evaluates the energy index according to the second function on the basis of the link identifier and the device identifier of the mobile device serving as the support subject.

According to the navigation server of the second aspect of the present invention, the links serving as the evaluation subjects of the energy index are refined to those constituting a part of or the entire part of plural support routes or navigation routes joining the departure position and the destination position of the mobile device. According thereto, the links serving as the evaluation subjects of the energy index are refined according to the necessity for guiding the mobile device serving as the support subject from the departure position to the destination position. Thereby, it may be expected to save or effectively utilize information processing resources in the navigation server needed to evaluate the energy index; similarly, it may be expected to effectively utilize information processing resources in the navigation apparatus needed to optionally select the energy index or the road traffic information based on the energy index.

The navigation server according to a third aspect of the present invention is dependent on the second aspect of the present invention, wherein the second support processing element comprehensively evaluates the energy index for an individual route of the plurality of support routes or navigation routes on the basis of the evaluated energy index; and enables the navigation apparatus to recognize the link identifier of a link constituting the support route or the navigation route having a peak comprehensive evaluation value as the road traffic information.

According to the navigation server of the third aspect of the present invention, it is possible for the navigation apparatus mounted in the mobile device serving as the support subject to recognize the optimum support route as the road traffic information based on the evaluation result of the energy index, from the viewpoint of guiding, with an attempt to save the energy, the mobile device serving as the support subject from the departure position to the destination position. Thereby, it is possible for the navigation apparatus to guide the mobile device serving as the support subject from the departure position to the destination position according to an appropriate support route or an appropriate navigation route set by the navigation apparatus on the basis of the support route, from the viewpoint of saving energy.

The navigation server according to a fourth aspect of the present invention is dependent on the first aspect of the present invention, wherein the first support processing element recognizes environmental information representing an environmental state for an area individually; and evaluates the energy index for an individual link according to the extended first function representing a correlation between the device identifier, the link identifier, the operation information, the energy index, and the environmental information, on the basis of the environmental information, the device identifier of the second probe mobile device, the link identifier of an individual link in each area, and the operation information.

According to the navigation server of the fourth aspect of the present invention, in addition to the operation state of the second probe mobile device in an individual link, it is possible to appropriately estimate or predict the energy consumption amount consumed by an arbitrary mobile device in an individual link by considering the environmental state in the area including the individual link.

The navigation server according to a fifth aspect of the present invention is dependent on the first aspect of the present invention, wherein the first support processing element recognizes the device identifier of a first probe mobile device, the link identifier of a link where the first probe mobile device has passed, the operation information of the first probe mobile device, and the energy index on the basis of communication with the first probe mobile device; and set or modify the first function on the basis of the evaluation result.

According to the navigation server of the fifth aspect of the present invention, the first function may be set on the basis of the device identifier of the first probe mobile device, the link identifier of the link where the mobile device has passed, the operation information and the energy index. Therefore, the first function may be appropriately set from the viewpoint of appropriately evaluating the energy index of the second probe mobile device in each passed link, by considering the type or the like of the second probe mobile device identified by the device identifier and the operation state of the second probe mobile device.

The navigation of a sixth aspect of the present invention is dependent on the fifth aspect of the present invention, which is further mounted with a device which operates in different modes according to the energy consumption amount by the first probe mobile device, wherein the first processing element recognizes an index defined according to an operation history of the device serving as a control subject on the basis of communication with the first probe mobile device as the energy index.

According to the navigation server of the sixth aspect of the present invention, the index defined according an operation history of the device mounted in the first probe mobile device in a link to be passed by the first probe mobile device is recognized as the energy index of the first probe mobile device. Since the device operates in different modes according to the energy consumption amount by the first probe mobile device, therefore, the first function may be appropriately set from the viewpoint of evaluating the energy consumption amount by an arbitrary second probe mobile device.

The navigation server according to a seventh aspect of the present invention is dependent on the sixth aspect of the present invention, wherein the first probe mobile device is mounted with an indicator which displays that the energy consumption amount by the first probe mobile device is in a low state or a lamp which lightens when the energy consumption amount is in a high state as the control subject device; and the first support processing element recognizes a display frequency of the indicator or lightening frequency of the lamp as the energy index on the basis of communication with the first probe mobile device.

According to the navigation server of the seventh aspect of the present invention, the display frequency of the indicator or the lightening frequency of the lamp is recognized as the energy index of the first probe mobile device. Since the indicator displays or the lamp lightens according to the energy index level of the first probe mobile device, the first function may be appropriately set from the viewpoint of evaluating the energy consumption amount by an arbitrary second probe mobile device.

The navigation server according to an eighth aspect of the present invention s dependent on the first aspect of the present invention, wherein the first support processing element recognizes a velocity and acceleration of the second probe mobile device or a positional transition history detected by the probe device as the operation information.

According to the navigation server of the eighth aspect of the present invention, by considering the energy consumption amount in relation to the velocity and the like of the second probe mobile device in an individual link, the first function may be appropriately set from the viewpoint of appropriately evaluating the energy index of the mobile device serving as the support subject in the individual link.

The navigation server according to a ninth aspect of the present invention is dependent on the eighth aspect of the present invention, wherein the first support processing element evaluates the energy index by using a linear function or at least a quadratic function having a coefficient in relation to the device identifier and the velocity and acceleration or a velocity and acceleration defined according to the positional transition history, and the velocity or the acceleration as an independent variable.

According to the navigation server of the ninth aspect of the present invention, by considering the energy consumption amount in relation to the velocity and the like of the second probe mobile device in an individual link, the first function may be appropriately set from the viewpoint of appropriately evaluating the energy index of the mobile device serving as the support subject in the individual link.

A navigation apparatus according to a tenth aspect of the present invention, which is configured to guide a mobile device serving as a support subject on the basis of communication with a navigation server, includes: a first processing element which is configured to recognize a departure position and a destination position of the mobile device serving as the support subject; and a second processing element which is configured to recognize a link identifier which is set by the navigation server for identifying an individual link constituting a support route formed by a plurality of links joining the departure position and the destination position or an individual link of a part of or the entire links in an area including the support route, and an energy index which represents an energy consumption amount by the mobile device serving as the support subject on the basis of communication with the navigation server, and output a navigation route joining the departure position and the destination position on the basis of the recognition result.

According to the navigation apparatus of the tenth aspect of the present invention, on the basis of the energy index appropriately evaluated by the navigation server by considering the operation state of the second probe mobile device in an individual link, an appropriate route may be output from the viewpoint of guiding the mobile device serving as the support subject, with an attempt to save the energy, from the departure position to the destination position.

The navigation apparatus according to an eleventh aspect of the present invention is dependent on the tenth aspect of the present invention, wherein the first processing element sets the navigation route; and the second processing element enables the navigation server to recognize the link identifier of an individual link constituting the navigation route set by the first processing element on the basis of communication with the navigation server; evaluates the energy index for an individual link evaluated in the navigation server; and comprehensively evaluates the energy index of the navigation route.

According to the navigation apparatus of the eleventh aspect of the present invention, the links which will be serving as the evaluation subjects for the energy index by the navigation server, or the links which are needed for the evaluation result of the energy index are refined from the viewpoint of guiding the mobile device serving as the support subject from the departure position to the destination position. Accordingly, it is expected to save the information processing resources needed by the navigation server to evaluate the energy index. Thereby, an optimum navigation route may be output from the viewpoint of guiding the mobile device serving as the support subject, with an attempt to save the energy, from the departure position to the destination position.

A navigation system according to a twelfth aspect of the present invention is comprised of a navigation apparatus which is mounted in a mobile device serving as a support subject, and a navigation server which is configured to support an arithmetic processing performed by the navigation apparatus on the basis of communication with the mobile device serving as the support subject, wherein: the navigation server includes a first function storing element which is configured to store a first function representing a correlation between a device identifier for identifying the mobile device, operation information representing an operation state of the mobile device, and an energy index representing an amount of energy consumed by the mobile device; a second function storing element which is configured to store a second function representing a correlation between the device identifier, a link identifier for identifying a respective link, and the energy index; a first support processing element which is configured to recognize the device identifier of the second probe mobile device, the link identifier of a link where the second probe mobile device has passed, and the operation information detected by a probe device mounted in the second probe mobile device on the basis of communication with the second probe mobile device; evaluate the energy index for each combination of the link identifier and the device identifier according to the first function on the basis of the recognition result; and set or modify the second function on the basis of the evaluation result; and a second support processing element which is configured to recognize the device identifier of the mobile device serving as the support subject; evaluate the energy index for an individual link identifier according to the second function on the basis of the recognition result; and enable the navigation apparatus mounted in the mobile device serving as the support subject to recognize the evaluation result or road traffic information defined according to the evaluation result on the basis of communication with the mobile device serving as the support subject, the navigation apparatus includes a first processing element which is configured to recognize a departure position and a destination position of the mobile device serving as the support subject; and a second processing element which is configured to recognize a link identifier which is set by the navigation server for identifying an individual link constituting a support route formed by a plurality of links joining the departure position and the destination position or an individual link of a part of or the entire links in an area including the support route, and an energy index which represents an energy consumption amount by the mobile device serving as the support subject on the basis of communication with the navigation server, and output a navigation route joining the departure position and the destination position on the basis of the recognition result.

According to the navigation system of the twelfth aspect of the present invention, the mobile device serving as the support subject can be guided, with an attempt to save the energy, from the departure position to the destination position on the basis of the evaluation result of the energy index recognized according to communication with the navigation server or the road traffic information in the navigation apparatus.

BRIEF DESCRIPTION OF THE DRAWINGS

FIG. 5 is a diagram illustrating the functions of the traffic information management system according to the present invention.

DETAILED DESCRIPTION OF THE PREFERRED EMBODIMENTS

Hereinafter, an embodiment of a navigation system according to the present invention will be described in detail with reference to the drawings.

Descriptions will be given on the configuration of the navigation system.

Figure 1:
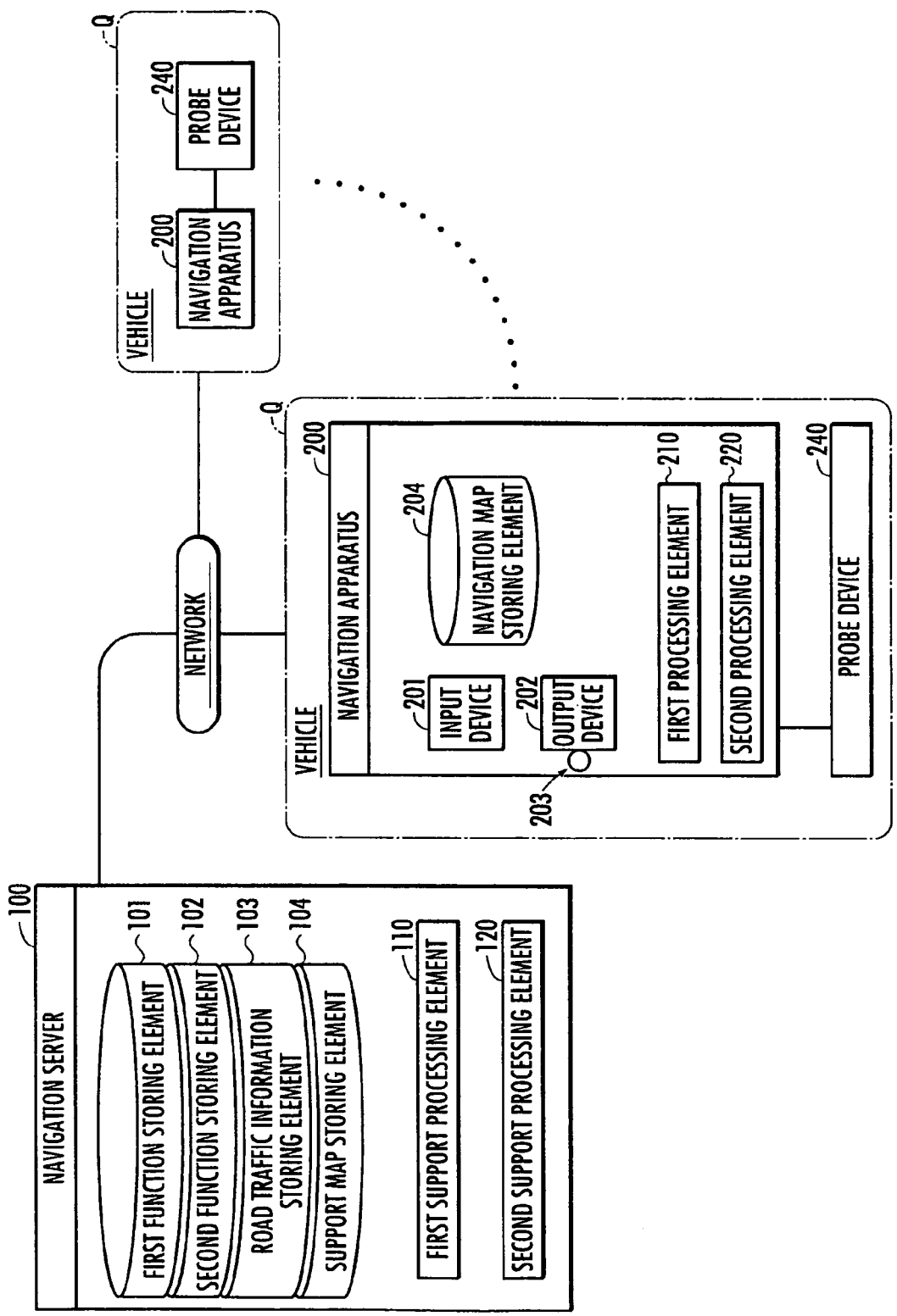
FIG. 1 is a diagram illustration a configuration of a road traffic information management system according to the present invention.

The navigation system illustrated in FIG. 1 includes a navigation server 100, and a navigation apparatus 200 mounted in a vehicle (mobile device) Q. The vehicle Q is mounted with a probe device 240. Due to the mounted probe device 240 which will be described hereinafter, the vehicle Q may be regarded as one or both of a first probe car (first probe mobile device) $Q_1$ and a second probe car (second probe mobile device) $Q_2$; due to the navigation apparatus 200 mounted, the vehicle Q may be regarded as a support subject. It should be noted that in addition to a four-wheeled vehicle, the mobile device according to the present invention includes an arbitrary device which moves by consuming energy from an internal combustion engine, a battery and the like according to operations or the like by a user, such as a two-wheeled vehicle or the like.

The navigation server 100 is comprised of one or plural server computers (including a CPU, a ROM, a RAM, an I/O and the like). The navigation server 100 is provided with a first function storing element 101, a second function storing element 102, a road traffic information storing element 103, a support map storing element 104, a first support processing element 110, and a second support processing element 120.

The first function storing element 101 is stored with a first function $f_1$ representing a correlation between a vehicle identification number (device identifier) VIN for identifying the vehicle Q, operation information $OP_i$ representing an operation state of the vehicle Q, and an eco-index (energy index) $ECO_i$ representing an energy amount consumed by the vehicle Q.

The second function storing element 102 is stored with a second function $f_2$ representing a correlation between the vehicle identification number VIN, a link identifier $L_i$ for identifying an individual link, and the eco-index $ECO_i$.

The road traffic information storing element 103 is stored with the road traffic information transmitted from a traffic information center server or the like (not shown) to the navigation server 100, such as a time required to move in an individual link and traffic congestion state in an individual link, information representing traffic regulation state for the individual link, an event state and the event type (if there were an event) around the individual link, and the like.

The support map storing element 104 is store with support map information. In the support map information, the location, shape and posture or the like of an individual link constituting a road are expressed by a series of coordinates ((latitude, longitude), or (latitude, longitude, altitude)). Moreover, an individual link is tagged with the link identifier $L_i$ for identifying the individual link and road type data.

The first support processing element 110, on the basis of communication with the first probe car $Q_1$, recognizes the vehicle identification number VIN of the first probe car $Q_1$, the link identifier $L_i$ of an individual link passed by the first probe car $Q_1$, the operation information $OP_i$ detected or determined by the probe device 240 mounted in the first probe car $Q_1$, and the eco-index $ECO_i$. On the basis of the recognition result, the first support processing element 110 sets or modifies the first function $f_1$.

The first support processing element 110, on the basis of communication with the second probe car $Q_2$, recognizes the vehicle identification number VIN of the second probe car $Q_2$, the link identifier $L_j$ of an individual link passed by the second probe car $Q_2$, and the operation information $OP_j$ detected or determined by the probe device 240 mounted in the second probe car $Q_2$. On the basis of the recognition result, the first support processing element 110 evaluates the eco-index $ECO_j$ for each combination of the link identifier $L_j$ and the vehicle identification number VIN, and sets or modifies the second function $f_2$ on the basis of the evaluation result.

The second support processing element 120, on the basis of communication with the support subject car Q, recognizes the vehicle identification number VIN of the support subject car Q. On the basis of the recognition result, the second support processing element 120 evaluates the eco-index $ECO_k$ for each link identifier $L_k$ according to the second function $f_2$. On the basis of communication with the support subject car Q, the second support processing element 120 enables the navigation apparatus 200 mounted in the support subject car Q to recognize the evaluation result or the road traffic information defined according to the evaluation result.

The navigation apparatus 200 is comprised of an ECU or a computer mounted in the vehicle Q as hardware, and a navigation program which provides the computer with various functions. It should be noted that the navigation program may be pre-installed in the memory (ROM) in the vehicular computer; or the entire or a part of the navigation program may be downloaded or broadcasted from a server (not shown) via a network or a satellite to the vehicular computer to store in the memory (EEPROM, RAM) or the like thereof at an arbitrary timing when there is a request or the like from the vehicular computer.

The navigation apparatus 200 is provided with an input device 201, an output device 202, an eco-lamp 203, a navigation map storing element 204, a first processing element 210, and a second processing element 220.

The input unit 201 is comprised of operating buttons disposed in a center console and a microphone in the vehicle Q. It is possible for a user to perform various settings by operating or vocally instructing the input unit 201. The output device 202 is a display unit disposed in the center console of the vehicle Q for displaying or outputting map information or the like.

The navigation apparatus 200 determines whether a mileage (=fuel consumption amount/moving distance) of a probe car $Q_x$ (x=1, 2) is equal to or smaller than a reference value. In the case where the mileage is determined to be equal to or smaller than the reference value, the eco-lamp 203 is lighted on; on the other hand, in the case where the mileage is determined to be greater than the reference value, the eco-lamp 203 is lighted off. Since the eco-lamp 203 is lighted on when the vehicle is running at a good mileage, it may afford a driver an incentive to pay attention to drive ecologically friendly to the environment with less energy consumption amount.

The navigation map storing element 204 is stored with navigation map information or the like to be output to the output device 202. In the navigation map information, the location, shape and posture or the like of an individual link constituting a road are expressed by a series of coordinates ((latitude, longitude), or (latitude, longitude, altitude)). Moreover, an individual link is tagged with the link identifier $L_i$ for identifying the individual link and road type data. Even the definitions of the coordinates in the navigation map information and the support map information are different due to the different specifications and data architectures therebetween, it is possible to match the links by tagging the identical links with a common link identifier.

The first processing element 210 recognizes a departure position $p_1$ and a destination position $p_2$ of the support subject car Q. The second processing element 220 recognizes the link identifier $L_k$ which is set by the navigation server 100 for identifying an individual link constituting the support route R formed by a plurality of links joining the departure position $p_1$ and the destination position $p_2$ or an individual link of a part of or the entire links in an area including the support route R, and the energy index $ECO_k$ which represents an energy consumption amount by the support subject car Q on the basis of communication with the navigation server 100, and outputs a navigation route r joining the departure position $p_1$ and the destination position $p_2$ on the basis of the recognition result.

The operation information detected or determined by the probe device 240 represents the operation state of the probe car $Q_x$, including apart of or the entire part of a position transition history (position at every predefined time), velocity (may be calculated from, for example, the position transition history), acceleration, velocity transition history, acceleration transition history of the probe car Q; the operation history of a device (engine, air conditioner or the like) mounted in the probe car $Q_x$; and the like. The lightening frequency of the eco-lamp 203 is determined as the eco-index $ECO_i$ by the probe device 240.

Note that "a component serving as hardware "recognizes" information" means that the component performs a possible information processing on a piece of information to prepare the piece of information ready for other information processing, for example, the component receives the piece of information; searches the piece of information in a database or memory or retrieves the piece of information from a database or memory; calculates, estimates, configures, determines, searches the piece of information or the like via arithmetic processing on the basis of the received basic information or the like; elicits information by decoding packages; and stores in memory or the like the calculated information or the like. In addition, "a component serving as hardware "outputs" information" means that the component outputs the information in form of picture, voice, vibration and the like, which may be recognized by a human by means of five senses thereof such as eyesight, hearing, touch, etc.

Functions of the aforementioned navigation system will be described with reference to FIG. 2 through FIG. 5.

Figure 2:
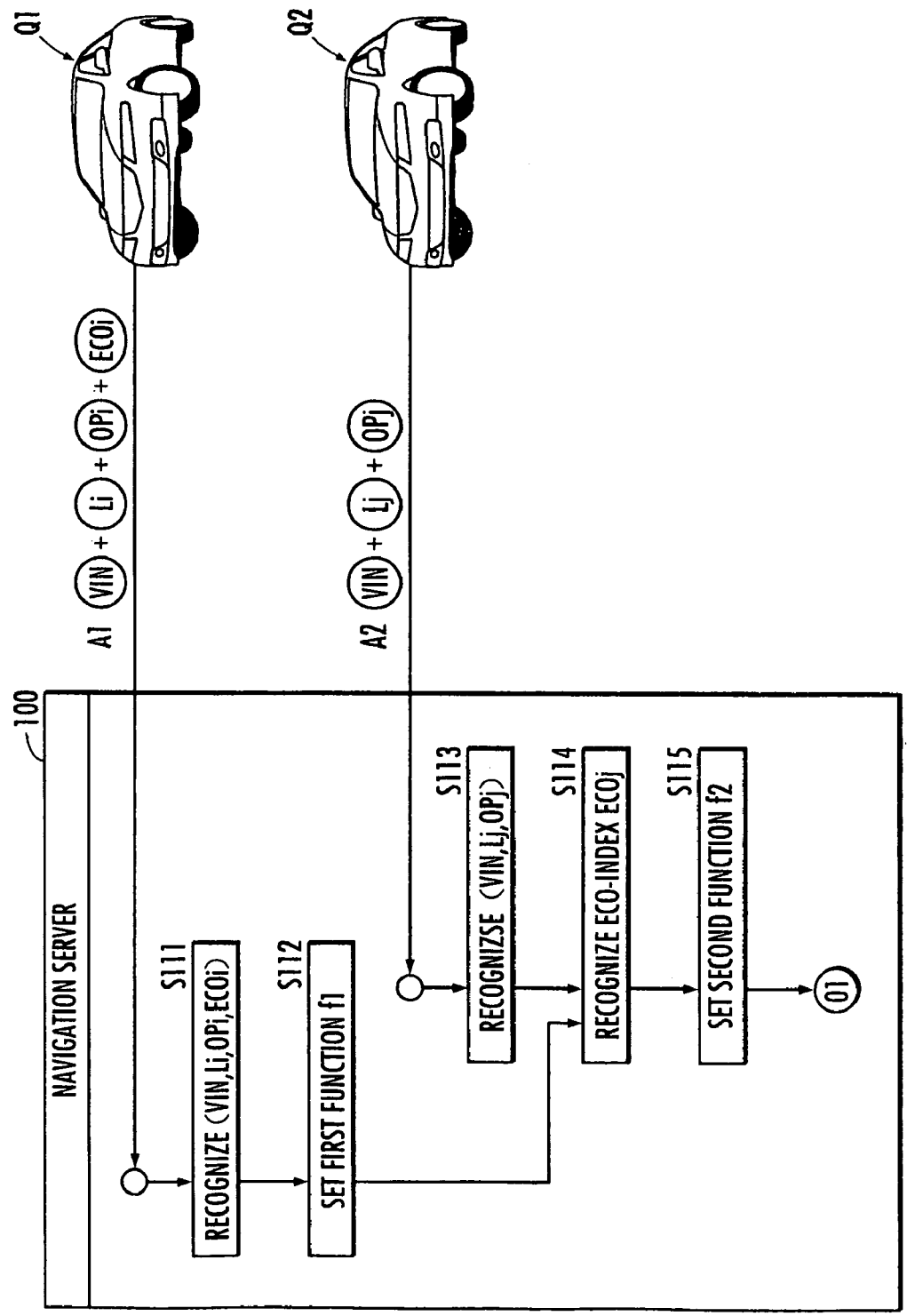
FIG. 2 is a diagram illustrating the functions of the traffic information management system according to the present invention.

Firstly, the vehicle identification number (manufacturer's serial number or the like to identify vehicular type and specifications) VIN of the first probe car $Q_1$, the link identifier $L_i$ (may be specified according to the matching between the navigation map information and a position determined by using GPS function, an acceleration sensor, a gyro sensor and the like) of an individual link where the first probe car $Q_1$ has passed, the operation information $OP_i$ such as the velocity and the like of the first probe car $Q_1$, and the eco-index $ECO_i$ are transmitted or uploaded as "first information" from the first probe car $Q_1$ to the navigation server 100 (FIG. 2/Arrow A1). As an alternative to the lighting frequency of the eco-lamp 203 of the first probe car $Q_1$, it is acceptable to evaluate an operation history of another vehicular device (injection amount of fuels to a combustion engine or the like) as the eco-index $ECO_i$.

The first support processing element 110 recognizes the first information (VIN, $L_i$, $OP_i$, $ECO_i$) (FIG. 2/S111), and sets the first function $f_1$ expressed by the following equation (1) on the basis of the first information (VIN, $L_i$, $OP_i$, $ECO_i$) (FIG. 2/S112).

$$ECO_i = f_1(VIN, L_i, OP_i) \qquad (1)$$

To set the first function $f_1$ refers to build a correlation between the vehicle identification number VIN, the link $L_i$, the operation information $OP_i$, and the eco-index $ECO_i$, in other words, to build a database, a table, an algorithm or the like which may be used to calculate or determine the last variable from any 3 variables in the mentioned 4 variables. The first function $f_1$ may be set as a linear function or at least a quadratic function having a coefficient relating to the velocity or the acceleration and the velocity or the acceleration as an independent variable.

The vehicle identification number of the second probe car $Q_2$, the link identifier $L_j$ where the second probe car $Q_2$ has passed, and the operation information $OP_j$ such as the velocity and the like of the second probe car $Q_2$ are transmitted or uploaded as "second information" from the second probe car $Q_2$ to the navigation server 100 (FIG. 2/Arrow A2).

The first support processing element 110 recognizes the second information (VIN, $L_j$, $OP_j$) (FIG. 2/S113), and evaluates the eco-index $ECO_j$ for an individual link where the second probe car $Q_2$ has passed according to the first function $f_1$ on the basis of the second information (VIN, $L_j$, $OP_j$) (FIG. 2/S114).

The first support processing element 110 sets the second function $f_2$ expressed by the following equation (2) on the basis of the vehicle identification number VIN and the link identifier $L_j$ of the second information and the evaluation result on the eco-index $ECO_j$ (FIG. 2/S115).

$$ECO_j = f_2(VIN, L_j) \qquad (2)$$

To set the second function $f_2$ refers to build a correlation between the vehicle identification number VIN, the link identifier $L_j$, and the eco-index $ECO_j$, in other words, to build a database, a table, an algorithm or the like which may be used to calculate or determine the last variable from any 2 variables in the mentioned 3 variables.

Next, descriptions will be given on the case where there is selected "an eco-route searching mode" for searching an appropriate route from the viewpoint of driving at a favorable mileage according to operations performed by a user on the input device 201 provided in the navigation apparatus 200 which is mounted in the support subject car Q.

Figure 3:
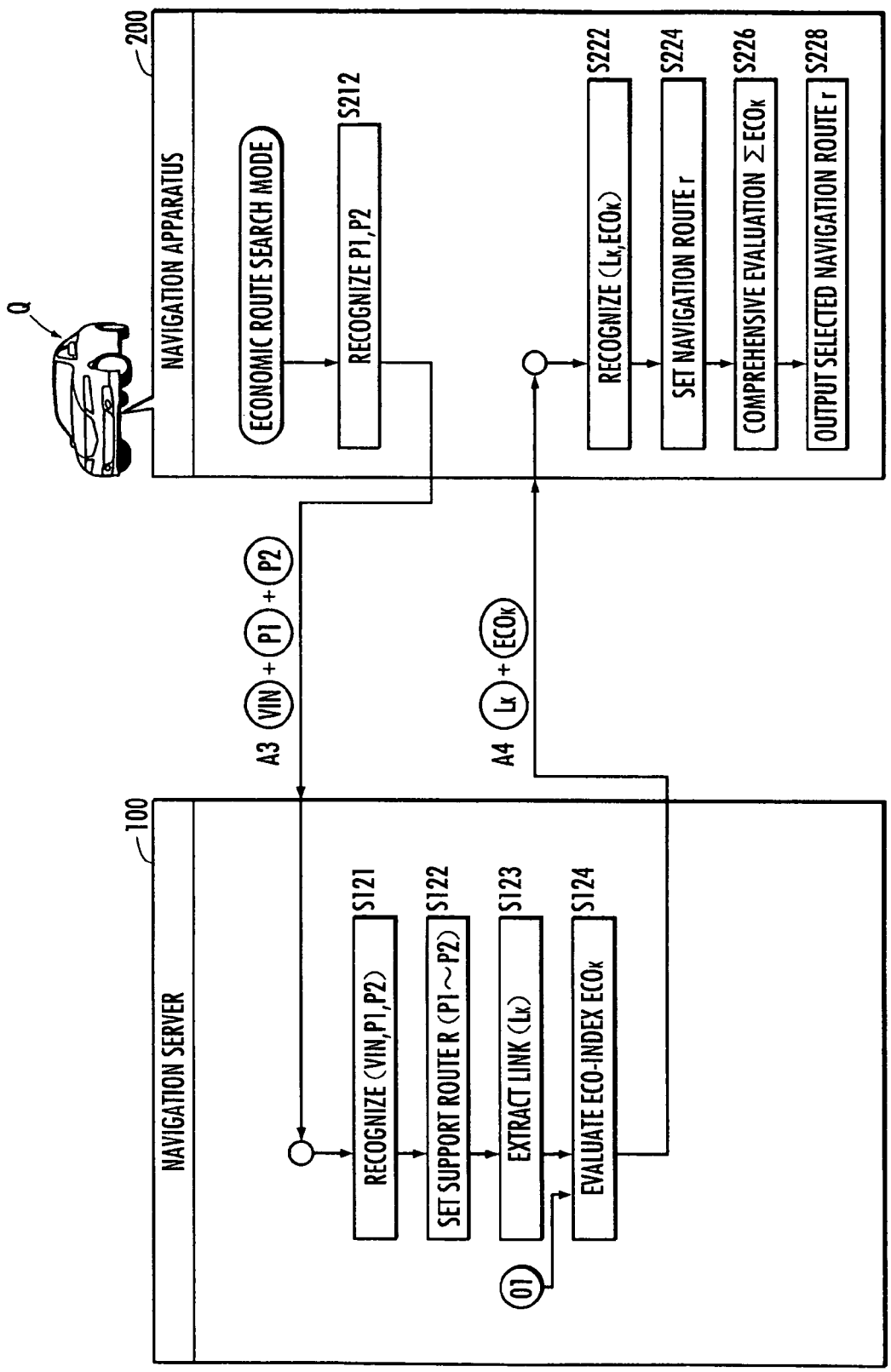
FIG. 3 is a diagram illustrating the functions of the traffic information management system according to the present invention.
Figure 4:
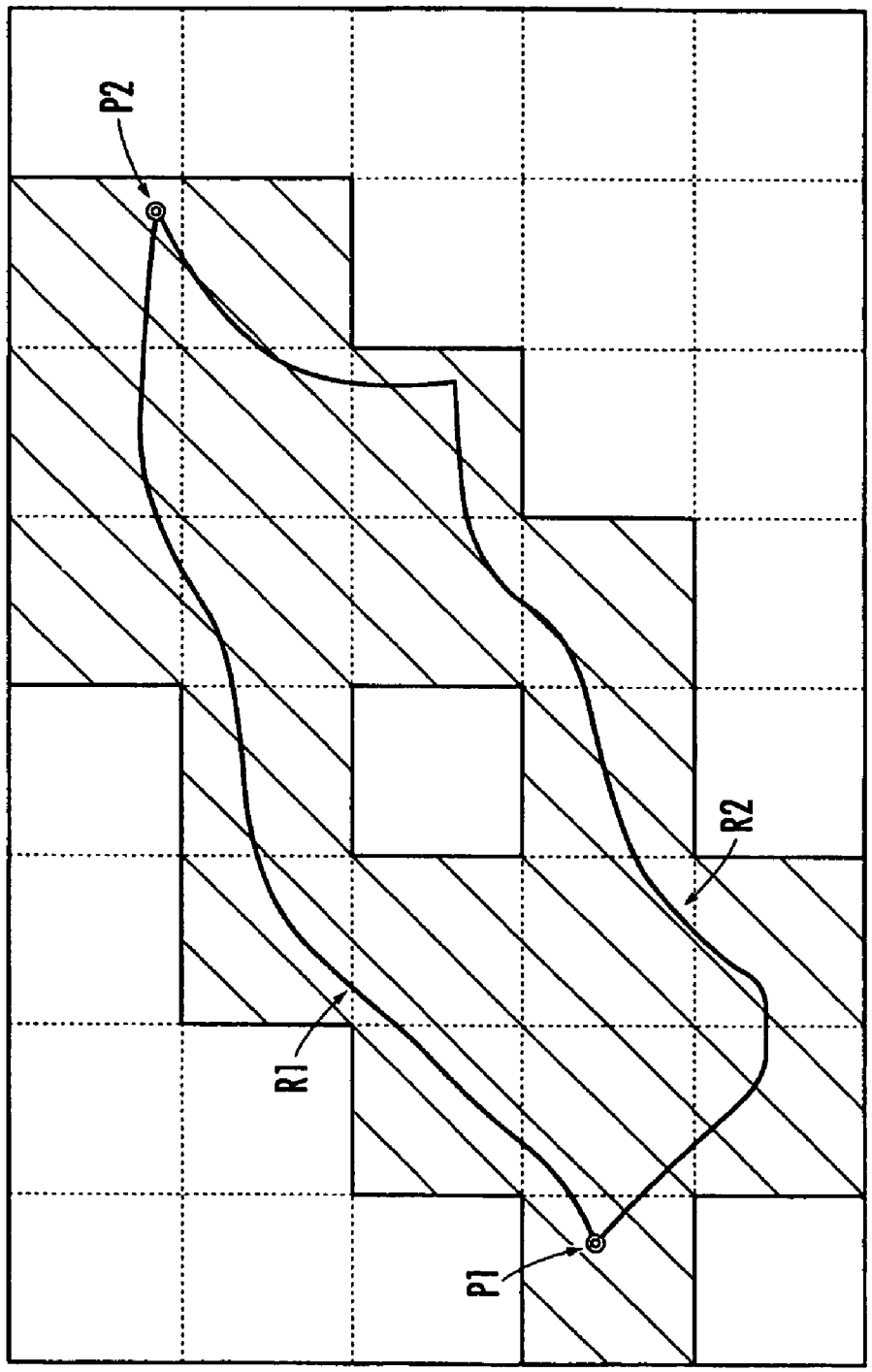
FIG. 4 is a diagram illustrating the functions of the traffic information management system according to the present invention.

Firstly, the first processing element 210 determines the departure position or present position $p_1$ of the vehicle Q and recognizes the destination position $p_2$ thereof (FIG. 3/S212). The present position $p_1$ is calculated or determined according to GPS signals received by a GPS receiver, or an arithmetic processing or the like on output signals from the acceleration sensor or the gyro sensor mounted in the vehicle. The destination position $p_2$ of the support subject car Q is inputted to the navigation apparatus 200 from the input device 201 by the user. Moreover, the departure position $p_1$ and the destination position $p_2$, together with the vehicle identification number VIN, are transmitted or uploaded as "support inquiring information" to the navigation server 100 from the support subject car Q (FIG. 3/Arrow A3).

According thereto, the second support processing element 120 in the navigation server 100 recognizes the support inquiring information (VIN, $p_1$, $p_2$) (FIG. 3/S121), and sets a single or a plurality of support routes R which joins the present position $p_1$ and the destination position $p_2$ on the basis of the road traffic information stored in the road traffic information storing element 103 and the support map information stored in the support map storing element 104 (FIG. 3/S122). Therefore, there are set in an example illustrated in FIG. 4 two support routes $R_1$ and $R_2$ which join the present position $p_1$ and the destination position $p_2$ of the support subject car Q.

Thereafter, the second support processing element 120 extracts the link identifiers $L_k$ for a plurality of links included in an area containing a part of the support route R from the navigation map information stored in the navigation map storing element 204 (FIG. 3/S123). Accordingly, for example, from a plurality of rectangular meshes (areas) illustrated in FIG. 4, the link identifiers $L_k$ for all the links containing a part of the support route $R_1$ or $R_2$ included in the slash-lined meshes are extracted or selected. Thereby, the links serving as the evaluation subject of the energy index $ECO_k$ are refined according to the necessity for guiding the support subject car Q from the departure position $p_1$ to the destination position $p_2$. As a result thereof, it is expected to save or efficiently utilize the information processing resources needed to evaluate the eco-index $ECO_k$ or the like in the navigation server 100, and the information processing resources needed for optionally selecting the eco-index $ECO_k$ or the road traffic information based on the eco-index $ECO_k$ in the navigation apparatus 200. It should be noted that it is acceptable to extract the link identifiers $L_k$ for the links constituting a part of or the entire part of the support route R.

The second support processing element 120, on the basis of the vehicle identification number VIN and the extracted link identifier $L_k$ (FIG. 3/S123) which are included in the support inquiring information, evaluates the eco-index $ECO_k$ for an individual link identified by the link identifier $L_k$ according to the second function $f_2$ (FIG. 3/S124).

Thereafter, the second support processing element 120 transmits to the support subject car Q identified by the vehicle identifier number VIN or downloads a combination of the link identifier $L_k$ and the eco-index $ECO_k$ as the road traffic information (FIG. 3/Arrow A5).

According thereto, the second processing element 220 in the navigation apparatus 200 mounted in the support subject car Q recognizes the road traffic information ($L_k$, $ECO_k$) (FIG. 3/S222).

Next, the second processing element 220, on the basis of the navigation map information stored in the navigation map storing element 204 and the road traffic information ($L_k$, $ECO_k$), sets a single or a plurality of navigation routes joining the departure position or the present position $p_1$ and the destination position $p_2$ (FIG. 3/S224). For example, as illustrated in FIG. 5, there are set 3 navigation routes of $r_1$ to $r_3$ joining the departure position or the present position $p_1$ and the destination position $p_2$. The navigation routes $r_1$ and $r_2$ set in the navigation apparatus 200 are identical to the support routes $R_1$ and $R_2$ set in the navigation server 100, respectively (refer to FIG. 4) due to the reason that the support routes $R_1$ and $R_2$ are reproduced in a whole in the navigation apparatus 200. On the other hand, the navigation route $r_3$ set in the navigation apparatus 200 is partially different from the support routes $R_1$ and $R_2$ set in the navigation server 100, respectively.

Thereafter, the second processing element 220, on the basis of the road traffic information (the link identifier $L_k$ and the eco-index $ECO_k$), evaluates the sum of the eco-index $ECO_k$, in other words, comprehensively evaluates $\Sigma_k ECO_k$ of the navigation route r (FIG. 3/S226). If the comprehensive evaluation $\Sigma_k ECO_k$ of the eco-index $ECO_k$ reaches the maximum value or is greater than a threshold value, the second processing element 220 selects the navigation route r and outputs the selected navigation route r through the output device 202 (FIG. 3/S228). For example, in the three support routes $r_1$, $r_2$ and $r_3$ illustrated in FIG. 5, when the $\Sigma_k ECO_k$ of the eco-index $ECO_k$ for the route $r_2$ reaches the maximum value, the support route $r_2$ is overlapped with the navigation map information and displayed on the output device 202.

According to the navigation system having functions mentioned above, the first function $f_1$ is constructed on the basis of the first information (the vehicle identification number VIN, the link identifier $L_i$, the operation information $OP_i$ and the eco-index $ECO_i$) obtained from a plurality of the first probe cars $Q_1$ (refer to FIG. 2/S111 to S112 and the equation (1)). Therefore, it is possible to set an appropriate first function $f_1$ from the viewpoint of appropriately evaluating the eco-index $ECO_j$ for an individual link to be passed by the second probe car $Q_2$ by considering the model type or the like of the second probe car $Q_2$ identified according to the vehicle identification number VIN and the operation state of the second probe car $Q_2$.

Moreover, on the basis of the second information (the vehicle identification number VIN, the link identifier $L_j$, the operation information $OP_j$) obtained from a plurality of the second probe cars $Q_2$, the eco-index $ECO_j$ is evaluated for each combination of the vehicle identification number VIN and the link identifier $L_j$ according to the first function $f_1$ (FIG. 2/S113). Further, on the basis of the evaluation result and the second information, the second function $f_2$ is set (refer to FIG. 2/S114 and S115, the equation (2)). As aforementioned, the eco-index $ECO_j$ representing the energy consumption amount for the second probe car $Q_2$ may be appropriately evaluated by considering the operation state of the second probe car $Q_2$ in an individual link, thereby, it is possible to appropriately set the second function $f_2$ from the viewpoint of estimating or predicting operation state of an arbitrary vehicle Q in the individual link.

Subsequently, on the basis of the support inquiring information (the vehicle identification number VIN, the departure position or the present position $p_1$, and the destination position $p_2$) obtained from the support subject car Q, the support route R joining the departure position and the destination is set. On the basis of the support route R, the link identifier $L_k$ (a link identified by the link identifier $L_k$) is extracted (FIG. 3/S121 to S123). In other words, the links serving as the evaluation subject of the eco-index $ECO_k$ are refined according to the necessity for guiding the support subject car Q from the departure position $p_1$ to the destination position $p_2$. Thereby, it is expected to save or efficiently utilize the information processing resources needed to evaluate and transmit the eco-index $ECO_k$ in the navigation server 100, and the information processing resources needed for optionally selecting the eco-index $ECO_k$ or the road traffic information based on the eco-index $ECO_k$ in the navigation apparatus 200.

On the basis of the recognition and extraction result, the eco-index $ECO_k$ for the link identifier $L_k$ is evaluated individually according to the second function $f_2$ (FIG. 3/S124). Further, the eco-index $ECO_k$ evaluated for the link identifier $L_k$ individually may be recognized by the navigation apparatus 200 mounted in the support subject car Q (FIG. 3/Arrow 4). Thereby, the eco-index $ECO_k$ related to the link identifier $L_k$ individually may be evaluated appropriately from the viewpoint of estimating or predicting the operation state of the support subject car Q in the individual link. Accordingly, the energy consumption amount of the support subject car Q driving along the navigation route r can be correctly evaluated in the navigation apparatus 200. On the basis of the evaluation result or the road traffic information, it is possible to guide, with an attempt to save the energy, the support subject car Q from the departure position $p_1$ to the destination position $p_2$ (refer to FIG. 5).

Note that it is acceptable for the first processing element 210 of the navigation apparatus 200 mounted in the support subject car Q to set the navigation route r, transmit the link identifier $L_k$ of a link constituting a part of or the entire part of the navigation route r to the navigation server 100 as the support inquiring information, and evaluate the eco-index $ECO_k$ corresponding to the link identifier $L_k$ included in a support supply information in the navigation server 100. Thereby, it is expected to save or efficiently utilize the information processing resources needed to evaluate and transmit the eco-index $ECO_k$ in the navigation server 100, and the information processing resources needed for optionally selecting the eco-index $ECO_k$ or the road traffic information based on the eco-index $ECO_k$ in the navigation apparatus 200.

Furthermore, it is acceptable for the second support processing element 120 to comprehensively evaluate the respective eco-index $ECO_k$ for a plurality of support routes R (or the navigation routes r set in the navigation apparatus 200) and make the navigation apparatus 200 recognize, as the road traffic information, the link identifier $L_k$ of a link constituting the support route R (or the navigation route r) in the case where the comprehensive evaluation reaches the maximum value. Accordingly, it is possible for the navigation apparatus 200 mounted in the support subject car Q to recognize the optimum support route R according to the evaluation result of the eco-index $ECO_k$, from the viewpoint of guiding, with an attempt to save the energy, the support subject car Q from the departure position $p_1$ to the destination position $p_2$.

It is also acceptable for the first support processing element 110 to recognize, on the basis of communication with a server such as an environmental information server or the like, the environmental information (weather information such as weather, temperature, humidity, rain amount, snow accumulation and the like, whether there are earthquake, flood damage and the like and the sufferings thereof, and so on) representing the environmental state in a plurality of areas, and evaluate the eco-index $ECO_k$ for the individual link according to the extended first function $f_1$ representing a correlation between the extended first information (VIN, $L_j$, $OP_j$, $ECO_j$, and the environmental information) on the basis of the environmental information, the vehicle identification number VIN of the second probe car $Q_2$, the link identifier $L_j$ of an individual link contained in each area, and the operation information $OP_j$. According thereto, it is possible to appropriately predict or estimate the energy consumption amount consumed by an arbitrary second probe car $Q_2$ in an individual link by considering the environmental state if the area containing the individual link, in addition to the operation state of the second probe car $Q_2$ in the individual link.

In the above embodiment, the first function $f_1$ is set on the basis of the first information obtained from the first probe car $Q_1$. As another embodiment, it is possible to set preliminarily the first function $f_1$ according to an empirical rule or the like.

Although the present invention has been explained in relation to the preferred embodiments and drawings but not limited, it should be noted that other possible modifications and variations made without departing from the gist and scope of the invention will be comprised in the present invention. Therefore, the appended claims encompass all such changes and modifications as falling within the gist and scope of the present invention.

What is claimed is:

1. A navigation server which is configured to support an arithmetic processing performed by a navigation apparatus mounted in a mobile device serving as a support subject on the basis of communication with the mobile device, comprising:

a first function storing element which is configured to store a first function representing a correlation between a device identifier for identifying the mobile device, operation information representing an operation state of the mobile device, and an energy index representing an energy amount consumed by the mobile device;

a second function storing element which is configured to store a second function representing a correlation between the device identifier, a link identifier for identifying an individual link, and the energy index;

a first support processing element which is configured to:
recognize the device identifier of a first probe mobile device, the link identifier of an individual link where the first probe mobile device has passed, and the operation information detected by a probe device mounted in the first probe mobile device on the basis of communication with the first probe mobile device;
evaluate the energy index for each combination of the link identifier and the device identifier according to the first function on the basis of the recognition result; and
set or modify the second function on the basis of the evaluation result; and a second support processing element which is configured to:
recognize the device identifier of the mobile device serving as the support subject;
evaluate the energy index for an individual link identifier according to the second function on the basis of the recognition result; and
enable the navigation apparatus mounted in the mobile device serving as the support subject to recognize the evaluation result or road traffic information defined according to the evaluation result on the basis of communication with the mobile device serving as the support subject.

2. The navigation server according to claim 1, wherein the second support processing element:
sets one or a plurality of support routes or recognizes a navigation route for guiding the mobile device serving as the support subject from a departure position to a destination position on the basis of communication with the mobile device serving as the support subject;
further recognizes the link identifier of an individual link which constitutes a part of or the entire part of the support route or the navigation route, or the link identifier of an
individual link in an area which includes a part of or the entire part of the support route or the navigation route; and
evaluates the energy index according to the second function on the basis of the link identifier and the device identifier of the mobile device serving as the support subject.

3. The navigation server according to claim 2, wherein the second support processing element:
comprehensively evaluates the energy index for each of the plurality of support routes or navigation routes on the basis of the evaluated energy index; and
enables the navigation apparatus to recognize the link identifier of an individual link constituting the support route or the navigation route having a peak comprehensive evaluation value as the road traffic information.

4. The navigation server according to claim 1, wherein the first support processing element:
recognizes environmental information representing an environmental state for each area; and
evaluates the energy index for an individual link according to the extended first function representing a correlation between the device identifier, the link identifier, the operation information, the energy index, and the environmental information, on the basis of the environmental information, the device identifier of the first probe mobile device, the link identifier of an individual link in each area, and the operation information.

5. The navigation server according to claim 1, wherein the first support processing element:
recognizes the device identifier of second probe mobile device, the link identifier of an individual link where the second probe mobile device has passed, the operation information of the second probe mobile device, and the energy index on the basis of communication with the second probe mobile device; and
sets or modifies the first function on the basis of the recognition result.

6. The navigation server according to claim 5 is further mounted with a device which operates in different modes according to the energy consumption amount by the second probe mobile device, wherein the first support processing element recognizes an index defined according to an operation history of the device serving as a control subject on the basis of communication with the second probe mobile device as the energy index.

7. The navigation server according to claim 6, wherein:
the second probe mobile device is mounted with an indicator which displays that the energy consumption amount by the second probe mobile device is in a low state or a lamp which lightens when the energy consumption amount is in a high state as the control subject device; and
the first support processing element recognizes a display frequency of the indicator or lightening frequency of the lamp as the energy index on the basis of communication with the second probe mobile device.

8. The navigation server according to claim 1, wherein the first support processing element recognizes a velocity and acceleration of the first probe mobile device or a positional transition history detected by the probe device as the operation information.

9. The navigation server according to claim 8, wherein the first support processing element evaluates the energy index by using a linear function or at least a quadratic function having a coefficient in relation to the device identifier and the velocity and acceleration or a velocity and acceleration defined according to the positional transition history, and the velocity or the acceleration as an independent variable.

10. A navigation system which is comprised of a navigation apparatus which is mounted in a mobile device serving as a support subject, and a navigation server which is configured to support an arithmetic processing performed by the navigation apparatus
on the basis of communication with the mobile device serving as the support subject, wherein:
the navigation server includes:
a first function storing element which is configured to store a first function representing a correlation between a device identifier for identifying the mobile device, operation information representing an operation state of the mobile device, and an energy index representing an energy amount consumed by the mobile device;
a second function storing element which is configured to store a second function representing a correlation between the device identifier, a link identifier for identifying an individual link, and the energy index;
a first support processing element which is configured to:
recognize the device identifier of a first probe mobile device, the link identifier of an individual link where the first probe mobile device has passed, and the operation information detected by a probe device mounted in the first probe mobile device on the basis of communication with the first probe mobile device;
evaluate the energy index for each combination of the link identifier and the device identifier according to the first function on the basis of the recognition result; and
set or modify the second function on the basis of the evaluation result; and
a second support processing element which is configured to:
recognize the device identifier of the mobile device serving as the support subject;
evaluate the energy index for an individual link identifier according to the second function on the basis of the recognition result; and
enable the navigation apparatus mounted in the mobile device serving as the support subject to recognize the evaluation result or road traffic information defined according to the evaluation result on the basis of communication with the mobile device serving as the support subject, the navigation apparatus includes:
a first processing element which is configured to recognize a departure position and a destination position of the mobile device serving as the support subject; and
a second processing element which is configured to:
recognize a link identifier which is set by the navigation server for identifying an individual link constituting a support route formed by a plurality of links joining the departure position and the destination position or an individual link of a part of or the entire part of links in an area containing the support route, and an energy index which represents the energy amount consumed by the mobile device serving as the support subject on the basis of communication with the navigation server, and
output a navigation route joining the departure position and the destination position on the basis of the recognition result.

* * * * *